Oct. 19, 1926.
H. J. CONROY ET AL
1,603,320
LINER FOR RUBBERIZED MATERIAL AND METHOD OF TREATING THE SAME
Filed Dec. 11, 1922
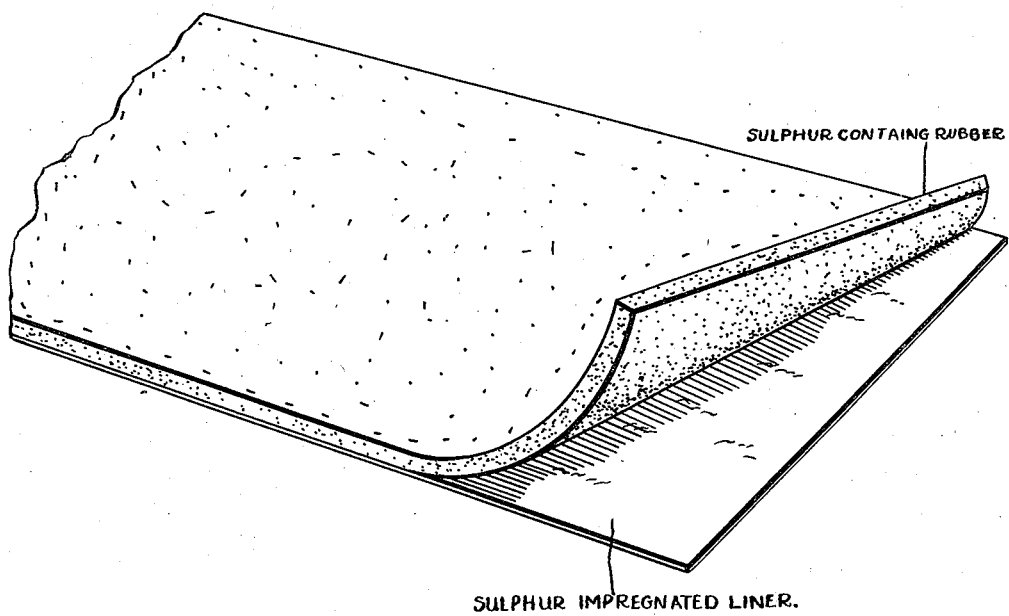
SULPHUR CONTAING RUBBER
SULPHUR IMPREGNATED LINER.
INVENTORS
Henry J. Conroy and
Russel A. Hayworth.
R.O. Trogner
ATTORNEY Patented Oct. 19, 1926.

1,603,320

UNITED STATES PATENT OFFICE.

HENRY J. CONROY, OF AKRON, OHIO, AND RUSSELL A. HAYWORTH, OF TORONTO, ONTARIO, CANADA, ASSIGNORS TO THE GOODYEAR TIRE & RUBBER COMPANY, OF AKRON, OHIO, A CORPORATION OF OHIO.

LINER FOR RUBBERIZED MATERIAL AND METHOD OF TREATING THE SAME.

Application filed December 11, 1922. Serial No. 606,350.

Our invention pertains to the manufacture of rubber and of rubberized material, and it has particular relation to a method of treating the liners which are adapted to be so disposed between the adjacent layers thereof as to prevent adhesion of the rubber to the liners.

It is customary in the manufacture of rubberized material, particularly of the sheeting type, to cause the same to move into engagement with and to be deposited upon a liner, composed of fibrous material, upon leaving the calender rolls. The liner, with the rubber disposed thereon, is then placed in layers or rolled into any desired compact form. Considerable difficulty has been experienced in this stage of the manufacture owing to the fact that certain rubber stocks, particularly the tube stocks, have a strong tendency to adhere to the liners, especially during warm weather. This frequently results in the loss of both time and material.

By our invention, we have obviated the aforementioned difficulties by so impregnating the liners, prior to the deposition of the rubber thereon, as to prevent the adhesion of the rubber thereto. This is accomplished by impregnating the liners with sulphur, which causes bloom of the rubber which is deposited thereon, thus preventing the rubber from adhering to the liners. One embodiment of our invention is illustrated in the accompanying drawing which includes a sulphur treated liner engaging a sulphur containing rubber composition.

In practicing our invention we desire to cause bloom of the rubber by bringing free sulphur into engagement with the surface of the rubber, thus initiating migration of sulphur from the sulphur super-saturated rubber compound.

In order to cause a deposition of free sulphur to be brought into engagement with the rubber, the liners are impregnated therewith. A quantity of sulphur is dissolved in a vat of carbon bisulphide, through which the liner is passed. The liner is then dried, preferably by passing it over a steam table, thus evaporating the carbon bisulphide and causing a deposition of free sulphur to remain in the liner. Owing to the highly inflammable nature of carbon bisulphide, we prefer to mix therewith a quantity of carbon tetrachloride, or other suitable material, which serves to materially reduce the fire hazard while passing over the steam table.

Although our invention is described as employing carbon bisulphide mixed with carbon tetrachloride as a means for impregnating the liner with the sulphur, it is obvious that any other desirable material may be employed under like conditions, the essential requirement being that a material be deposited upon the liner which will serve to cause bloom of the rubber.

Although we have described in detail but a single form which our invention may assume, it will be apparent to those skilled in the art that it is not so limited but that various minor modifications and changes may be made therein without departing from the spirit of our invention or from the scope of the appended claims.

What we claim is:

1. A process which comprises bringing a sulphur impregnated fabric into contact with a sheet of unvulcanized rubber.

2. A combination of layers of unvulcanized rubber and sulphur impregnated liner.

3. A process which comprises bringing sulphur impregnated fabric into contact with a sheet of unvulcanized rubber containing sulphur.

4. The combination of layers of unvulcanized sulphur containing rubber and sulphur impregnated liner.

In witness whereof, we have hereunto signed our names.

HENRY J. CONROY.
RUSSELL A. HAYWORTH.